United States Patent Office 2,867,508
Patented Jan. 6, 1959

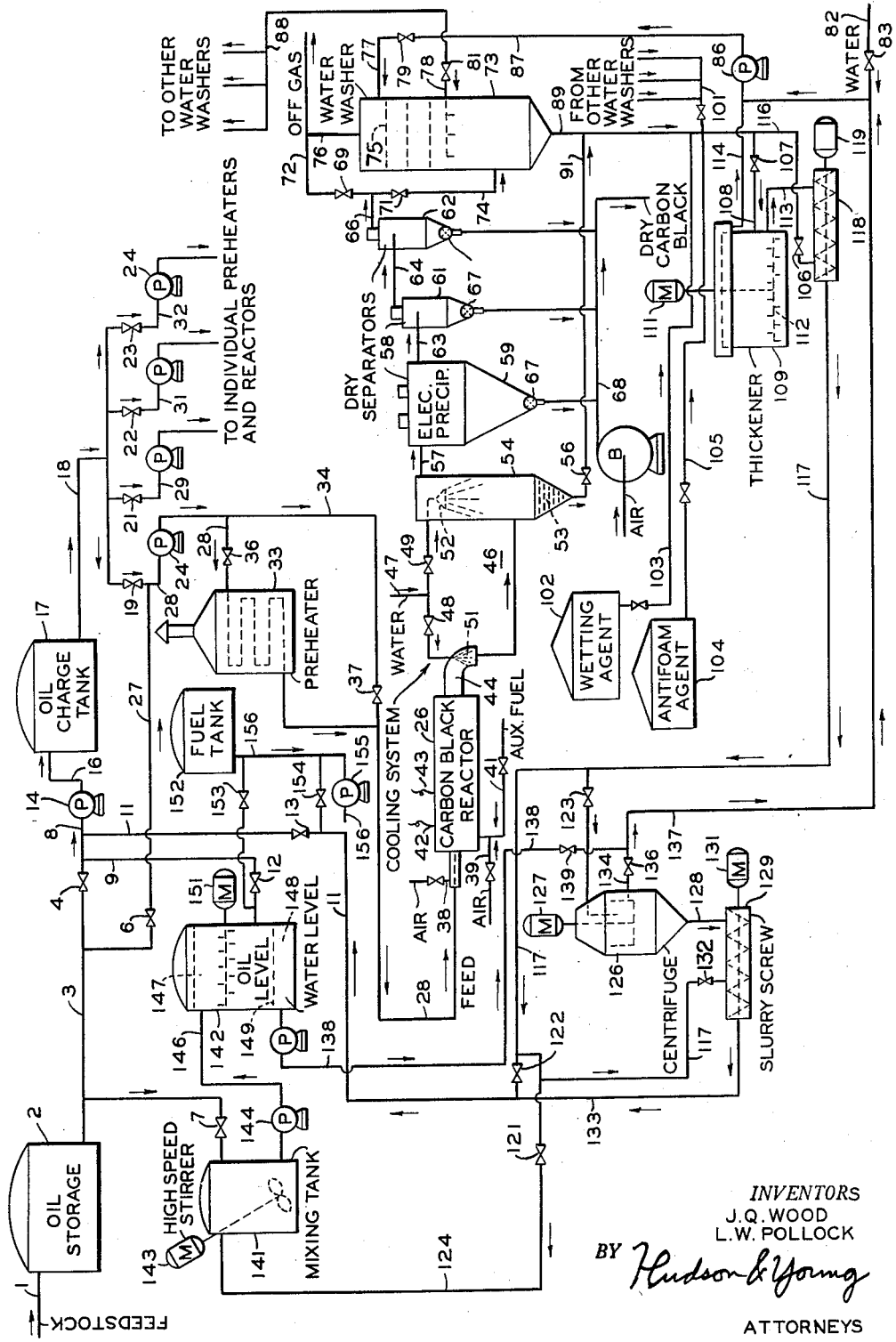

2,867,508

PROCESS FOR PRODUCING CARBON BLACK

James Q. Wood and Lyle W. Pollock, Bartlesville, Okla., assignors to Phillips Petroleum Company, a corporation of Delaware Application January 3, 1952, Serial No. 264,708

12 Claims. (Cl. 23—209.4)

This invention relates to processes for producing carbon black and to apparatus for carrying out such processes. In another aspect it relates to a carbon black producing process in which a first feed comprising a major portion of normally liquid hydrocarbons is pyrochemically converted into a gaseous effluent containing suspended carbon black particles from which at least a portion of the suspended carbon black is recovered by water-washing as an aqueous slurry, said aqueous slurry is at least partially dewatered and is then mixed with further normally liquid hydrocarbons to then be used as said first feed or as an auxiliary fuel to said original pyrochemical conversion; or to be used as a second feed or as an auxiliary fuel to another pyrochemical conversion in a separate second carbon black reactor, the gaseous effluent of which second reactor contains dry carbon black particles which may be collected in the same, or in any other known manner, which may include collecting a portion of said carbon black as a second aqueous slurry, or not, as desired, and if said second aqueous slurry is produced it may be mixed with further normally liquid hydrocarbons to form a third feed or an auxiliary fuel for the same or further pyrochemical conversions, or not, as desired. In another aspect it relates to apparatus allowing such process to be carried out. In one modification the at least partial dewatering of the aqueous carbon black slurry is accomplished by mechanical water separation alone, while in the other embodiment at least part of said at least partial dewatering is accomplished by mixing said aqueous slurry with a normally liquid hydrocarbon and then allowing the mixture to separate into an oil phase and a water phase, the carbon black transferring during the mixing and separating processes from the aqueous phase into the oil phase to a major extent due to the hydrophobic and oleophillic properties of said carbon black, the resulting at least partially dewatered oil slurry of carbon black being then mixed with further portions of normally liquid hydrocarbon to produce a fourth feed or an auxiliary fuel for the original or further pyrochemical conversion steps in the same manner as described above with relation to said first, second and third feeds.

In the prior art of pyrochemically converting a feed comprising a major portion of normally liquid hydrocarbon into carbon black, a gaseous effluent is produced in the carbon black reactor comprising gases and dry carbon black particles suspended in said gases. The gaseous effluent is cooled and the carbon black collected therefrom. In the process of cooling the gaseous effluent sometimes an aqueous slurry is produced containing some of said carbon black, and sometimes all, or a portion, of the collecting of said carbon black is by water-washing which produces an aqueous slurry containing some, or all, of said carbon black, but generally the major portion of the carbon black is collected by dry separation as a dry flocculent powder. The dry flocculent powder finds a ready market either in that form, or after being pelleted, but while the aqueous slurry can be, and often is, commercially used, there is not yet a ready market for the same and a problem therefore generally exists as to how to convert this aqueous slurry into a valuable dry commercial form, or burn the same as fuel.

The present invention converts this aqueous slurry into a dry, readily salable product by transferring said slurry to the feed to the same, or another, pyrochemical conversion step, which step vaporizes any entrained water and resuspends the carbon black as dry carbon black particles in the gases, which can then be separated as a dry salable product, or burns the carbon black as fuel.

One object of this invention is to provide an improved process for producing carbon black, or burning water collected carbon black as fuel.

Another object is to provide an improved system of apparatus for carrying out said improved process.

Another object is to provide a process whereby aqueous carbon black slurries, accidentally and/or deliberately produced in the process of producing carbon black and/or separating the same, are converted into dry carbon black by at least partially dewatering said slurries and mixing them with the feed to the same or other carbon black producing processes, or mixing them with auxiliary fuel to said processes.

Another object is to produce an improved process and system for at least partially dewatering aqueous carbon black slurry mechanically.

Another object is to produce an improved process for at least partially dewatering aqueous carbon black slurry by mixing the same with normally liquid hydrocarbon and producing an aqueous phase and a hydrocarbon phase in which the carbon black, due to its hydrophobic and oleophilic properties, is largely transferred to said hydrocarbon phase and is thereby at least partially dewatered.

Another object is to produce a system of apparatus for carrying out the improved process of the preceding three paragraphs.

Numerous other objects and advantages will be apparent to those skilled in the art upon reading the accompanying specification, claims and drawings.

In the drawing the single figure is a diagrammatic elevational view of a carbon black producing system embodying the present invention.

Starting at the upper left hand corner of the drawing, a feed stock 1 is employed, comprising a major portion of normally liquid hydrocarbon. Minor portions of partially oxidized hydrocarbons, and hydrocarbons and partially oxidized hydrocarbons containing minor portions of other elements such as nitrogen, sulfur and the like elements, and minor amounts of such elements as free sulfur may also be contained in the feed stock without undue detriment and the feed stock will still be called a normally liquid hydrocarbon feed. It appears that the best feed stock available would be substantially all normally liquid hydrocarbons in which the number of carbon atoms approaches the number of hydrogen atoms, as in a more or less aromatic feed stock, but this is not essential, as any substantially normally liquid hydrocarbon may be employed. Economic factors are involved as some suitable feed stocks, such as pure benzene, are too valuable for other purposes to be used in conversion to carbon black. As an example, a recycle gas oil stock from some type of cracking process is particularly useful as a feed stock because it contains a considerable quantity of aromatic compounds and at present is within the economic cost range suitable for conversion to carbon black. All such feed stocks mentioned in this paragraph will be referred to in the specification as normally liquid hydrocarbons, and in order to save space in the drawing, will be merely referred to as "oil" because all normally liquid hydrocarbons can be generically termed to be oil.

The feed stock 1 may be stored in suitable oil storage tank 2 from which it may be distributed to various points in the system through manifold 3, the branches of which are controlled by shutoff valves 4, 6 and 7.

The feed stock 1 passing through tank 2, manifold 3 and valve 4 may be blended in pipe 8 with materials coming from pipes 9 and/or 11 controlled by valves 12 and 13 respectively, said materials 9 and/or 11 being described further on in the specification. Complete mixing may be assured by passing through pump 14 if desired, and the feed stock may then be passed through line 16 into a charge tank 17.

Feed stock from charge tank 17 passes into manifold 18 from which it may be drawn through one or more valves 19, 21, 22 and 23 to individual preheaters and reactors (to be described further below) by pumps such as pump 24. When it is desired to supply at least one of said reactors, such as reactor 26, with feed stock 1 without the admixture of either the materials 9 or 11, the same may be accomplished by shutting valve 19 and opening valve 6 in line 27. While not shown, line 27 obviously could be a manifold with a shutoff valve in each branch leading to as many of feed lines 28, 29, 31 and 32 as may be deemed desirable.

While four lines 28, 29, 31 and 32 have been shown to indicate a plurality of the same, obviously there can be any number desired, and each of lines 29, 31 and 32 and any other lines (not shown) that may be provided each lead to an individual carbon black reactor in the same manner that line 28 leads to reactor 26 as shown in the drawing. Each carbon black reactor, such as 26, may have its own individual cooling system, dry separators, and water-washer as will be described below with reference to reactor 26; however, it is common to combine the output of two or more reactors in order to use at least in part a common cooling system, dry separation system and water-washing system, and the same may be done in practicing the present invention except that when some of the reactors are running on straight hydrocarbon feed stock, such as comes through line 27, and some are running on a mixture of hydrocarbon feed stock and such materials as come through lines 9 and/or 11, as distributed by manifold 18, in such instances it may be desirable to keep the effluents from the two groups of reactors working on the different feed stocks separate, at least until after the dry separators have been passed, so that the separately collected different types of dry carbon black from the two systems may be kept separate. For example, the reactors running on straight hydrocarbon feed may be producing HAF (high abrasion-resistance furnace black) and the reactors on the mixed feed may be producing MAF (medium abrasion-resistance furnace black) or HMF (high modulus furnace black).

That portion of the system relating to carbon black reactor 26 will now be described, it being understood that the system relative to the other reactors (not shown), is similar.

When the feed stock comes from line 27 into line 28, it may be pumped through line 28 by pump 24, preferably passing through preheater 33 where it may be in whole or partly vaporized, and continuing through line 28 into the carbon black reactor 26, which in many instances may be termed a carbon black furnace. In some instances, however, it may be desirable to bypass preheater 33 in whole or in part by passing the feed from either line 18 or 27 through line 34 by adjusting valves 36 and 37, the liquid feed reaching carbon black reactor 26 being sprayed into the same. Generally, rather than bypass a portion of said feed it is preferable instead to merely cut down the amount of heat furnished preheater 33.

Carbon black reactor 26 may be any carbon black reactor of the prior art in which a normally liquid hydrocarbon is pyrochemically converted into a gaseous effluent comprising gases and dry carbon black particles suspended in said effluent. Examples of such carbon black reactors and the processes carried out therein to pyrolytically convert said feed are shown in the issued patent Re. 22,886 of J. W. Ayres of June 3, 1947, and the patents of J. C. Krejci 2,375,795 of May 15, 1945, and 2,564,700 of August 21, 1951. It should be understood however, that these patents which are cited are merely given as examples, as there are numerous other patents and publications in the prior art describing other carbon black producing systems and any of these other systems or processes which pyrochemically converts a feed comprising a major portion of normally liquid hydrocarbon into a gaseous effluent comprising gases and dry carbon black particles suspended therein can be employed as any of the carbon black reactors in the present invention, such as carbon black reactor 26.

In order to supply heat for the pyrochemical conversion, air may be supplied intermittently or continuously through lines 38 and/or 39, and if desired auxiliary fuel may be supplied to some or all of the reactors through line 41, depending entirely upon the type of prior art pyrochemical conversion chosen for reactor 26. In producing HAF black it is preferred to supply auxiliary fuel whereas in producing MAF or HMF black it is preferred to use air alone.

Four general types of these pyrochemical conversions may be named, as well as several other similar types which are not named herein, but which are a part of the prior art and may also be used in practicing the present invention. These four types are (1) those in which the major portion of the heat is produced by burning a portion of the feed 28 with air in incomplete combustion, (2) those in which the major portion of the heat is provided by burning auxiliary feed 41 in partial or complete combustion with air in order to furnish the heat to pyrochemically convert the feed, (3) those in which a portion of the feed, or an auxiliary fuel, is substantially completely combusted in the reactor heating the same, and then the heating is halted while the feed is intermittently fed into the reactor to be pyrochemically converted by the residual heat of the reactor, and (4) those in which the feed, with or without air and/or auxiliary fuel, is pyrochemically converted in the reactor by means of a separate heater, such as an electrical heater, taking power from wires 42 and 43.

In any event, carbon black reactor 26 produces a gaseous effluent comprising gases and dry carbon black particles suspended in said effluent which passes out through pipe 44 into cooling system 46 at a temperature well above the boiling point of water, and above the dew point of said gaseous effluent if the same contains water vapor, as it often does.

Cooling system 46 may employ entirely indirect cooling through pipes with the atmosphere or with some other coolant, such as water, but preferably cooling system 46 also includes one or more direct injections of water in the form of spray into the gaseous effluent, as will now be described.

When direct water cooling of the gaseous effluent is employed, the water enters the cooling system through pipe 47 and by opening either of valves 48 or 49 or both, enters directly into the gaseous effluent as water sprays 51 and/or 52 respectively. It is not desired to have either or both sprays 51 and/or 52 lower the temperature of the gaseous effluent to a point too close to the dew point thereof or too close to the boiling point of water.

When spray 51 is employed, it is useful as a quench for substantially stopping the carbon black forming reaction by cooling the gaseous effluent below the temperature of the reaction. When water spray 52 is used it is chiefly useful for tempering the temperature of the gaseous effluent in the cooling system 46 to a point where it will be at a temperature best for the operation of the dry separators to be described later. Generally more water is supplied to spray 52 in the summertime than in the winter time because the effect of the atmosphere on cooling system 46 produces more cooling in the wintertime than in the summer. Even though spray 52 is not lowering the temperature of the effluent gases to a point so close to the dew point or the boiling point of water, that subsequent cooling in the dry separators would cause the deposit of water therein, under some conditions of operation some of the water in spray 52 does not always completely evaporate, and may at times form an aqueous carbon black slurry 53 in the bottom of cooling tower 54. When the aqueous slurry 53 forms, it may be drawn off through valve 56 as will be explained later.

The gaseous effluent containing substantially all of the suspended carbon black passes through line 57 into the dry separators 58 which will now be described.

Numerous systems for the dry separation of suspended carbon black from gaseous effluents (not shown) are known in the prior art and any of these systems may be employed in practicing the present invention. In order to provide a preferred specific embodiment, for purposes of illustration, a certain arangement of dry separators 58 has been shown, but it should be understood that any other suitable arangement and selection of dry separators known to the prior art, including bag filters and/or siren separators (not shown) may be employed, with or without cyclone separators (like 61 and 62) in place of the embodiments shown in the drawings of dry separators 58. The preferred embodiment of dry separators 58 shown in the drawing consists of an electrical precipitator 59 followed in series by one or more cyclone separators 61 and 62 connected in series by conduit 63 and 64 for the gaseous effluent, the residual gaseous effluent, relieved of a major portion of the suspended carbon black, passing from dry separator 58 through conduit 66.

In the electrical precipitator 59 the gaseous effluent from 57 passes through an electrostatic field between oppositely charged members which results in the precipitation of a minor portion of the carbon black and coagulation of a major portion of the carbon black particles into larger particles which pass out through pipe 63 in a form where the major portion thereof can be easily separated out by cyclone separators 61 and 62 of the usual type. Dry carbon black in the form of a dry flocculent powder collects in the bottom of vessels 59, 61 and 62 and may be collected therefrom in any suitable manner, as by passing the powder through conventional star valves 67 in the bottom of each chamber into a conventional pneumatic collection system 68.

The off-gases passing through pipe 66 contain relatively little carbon black and can be discharged in that condition by closing valve 71 and opening valve 69 and passing the off-gases from line 66 into line 72, which can lead to the atmosphere, or utilize the same by burning the same in a burner (not shown). In such case the process of the present invention has to be practiced on the aqueous slurry 53 formed in tower 54 alone. It is preferred to shut valve 69 and open valve 71 so that the off-gas from 66 passes into the water washer 73 through pipe 74. In the preferred embodiment the off-gases pass from pipe 74 through water washer 73 into pipe 76 to line 72 which leads to the atmosphere, or to some other type of disposal, such as burning (not shown) in counter-current contact with water sprays coming in through pipes 77 and 78 controlled by valves 79 and 81 respectively, as shown. Water for this purpose is supplied from pipe 82 in the lower right hand corner of the drawing, controlled by valve 83, and the water passes through pipe 84, pump 86 and pipe 87 to the spray line 77 and 78. Water may be condensed out of the gaseous effluent if there is sufficient cooling in the water washer 73, or water may evaporate therein depending on its temperature. In instances when there are other water washers like 73 in connection with one or more of the other individual preheaters and reactors supplied by pipes 29, 31 and 32, water for them may be supplied through manifold 88 from pipe 87. It should be understood that the washing in washer 73 need not be countercurrent but can be concurrent, and in either instance can be by sprays alone, by sprays and baffles plates 75, or sprays and moving vanes such as a "Rotoclone" (quoted name is a trademark for one type spray with moving vanes, not shown). The water flowing down through tower 73 washes the remaining carbon black out of the gas from pipe 74 as it passes to pipe 76, forming an aqueous liquid carbon black slurry which passes out through pipe 89 and which may be augmented by other aqueous liquid carbon black slurries coming from cooling tower 54 through line 91 and from the water washer and cooling towers (not shown) to which water 88 was sent, returning through pipe 101 if desired. Of course if desired, instead of the individual preheaters and reactors to which pipes 29, 31 and 32 lead, having separate water washers (not shown), as many of these reactors can use the same collection system including the water washer, such as 73, by obvious manifolding pipes (not shown) as is consistent with the specific process being carried out.

While not essential to the practice of the present invention, aqueous liquid carbon black slurry often is more easily handled if a small percentage of wetting agent 102 is added through line 103 and/or a small percentage of an anti-foam agent is added through line 105.

It is not believed desirable, nor necessary, to attempt to catalog all the possible wetting agents and anti-foam agents, as they are well known to the art, although many are known by their trade names rather than their composition. As examples, "Daxad-11," a polymerized sodium salt of alkyl-naphthalene sulfonic acid, wherein the alkyl group is a short chain, such as iso-propyl, and "Marasperse," a sodium lignin sulfonate, are both excellent wetting agents. Usually about .5 to about 3% of "Marasperse" plus .2 to .4 percent of caustic based on the weight of the carbon black makes the best aqueous slurry. Using the same proportions of wetting agent, the wetting agent can be all "Daxad-11" or mixtures of "Daxad-11" and "Marasperse." Te Grotenhuis et al. 2,141,090 of May 4, 1948, lists many wetting and dispersing agents suitable for the present purposes, as does Amon 1,910,419 of May 23, 1933. Similarly, numerous anti-foam agents are on record and they are all good, although each engineer has his favorite. It is believed Turkey red oil is about as good as any other anti-foam agent, although no preference is hereby expressed for the same, as any anti-foam agent may be employed in any recommended or experimentally determined quantity that is desired, very little being needed, if any. It should be understood that commercial operations can be carried out without any wetting agent or anti-foam agent at all, their use often being undesirable if oil extraction 142 is used.

In the most preferred embodiment of the present invention, valve 106 is closed and 107 is open so that the aqueous liquid carbon black slurry from pipe 89 passes through pipe 108 to a thickener 109 which is shown as a Dorr continuous thickener driven by a motor 111 which rotates a set of paddles 112. This device 109 passes a thickened slurry out line 113, while more or less purified water decants by overflowing from the top of tank 109, is passed out through line 114 to recycle through pump 86 and line 87, and forms part of the washing spray of the water wash step 73 taking more carbon black from the gaseous effluent. In place of the Dorr type thickener 109 shown, there are many other types of thickeners and water separators of a similar nature which can be used as equivalents. The amount of thickening which takes place in 109 may be varied within fairly wide limits, depending on the wishes of the operator. When not using any wetting agent, it is recommended that the slurry in line 113 be about 3% to 5% by weight of carbon black, although with a small amount of wetting agent 102 it can be run up to 12% by weight of carbon black.

In some instances it is preferred to by pass the thickener 109, which can easily be done by closing valve 107 and opening valve 106, allowing flow through bypass line 116 into line 117. Also if it is found that the slurry in line 113 is more concentrated than desired, the flow through lines 108 and 116 can be proportioned by manipulating valves 106 and 107, and the more watery slurry from line 116 will be blended with the heavier slurry from line 113 with ease in the slurry screw conveyor, or pump, 118 driven by motor 119.

The aqueous slurry is pumped through line 117 from which it may be dispersed through one or more of valves 121, 122 and/or 123. Slurry passing through valve 121 into line 124 goes to the carbon black hydrocarbon extraction system to be described later. Slurry going through valve 122 goes directly through line 11 controlled by valve 13 to be blended by pump 14 to the essentially hydrocarbon feed which goes to the reaction through line 18, and in some instances for certain grades of carbon black the thickening which has occurred in thickener 109 is sufficient for this purpose. Carbon black slurry going through valve 123, however, is further concentrated in centrifuge 126.

While the centrifuge 126 is illustrated, obviously any known type of centrifugal separator, liquid-solid cyclone separator, or rotary filter and scraper separator (all not shown) could be substituted in place of the same, being known as equivalents in the art. Centrifuge 126 is driven by motor 127 and produces a more concentrated slurry which passes through pipe 128 into a slurry screw 129 driven by motor 131. The slurry at this point may have from 3 to 50% by weight of carbon black, although it is not recommended to go much over 10% unless a wetting agent is present in minor amounts. Higher concentrations than desired in the slurry may be corrected by the addition of less concentrated slurry from line 117 through valve 122, and the product is forced through line 133 into lines 8 and 11 where it is blended with the normally liquid hydrocarbon feed which reduces the viscosity by diluting the slurry.

In making the drawing the draftsman has shown slurry screw 129 at a considerable distance from pipe 8 in order to show all parts in two dimensions without overlapping, but in practice it is recommended that centrifuge 126, slurry screw 129 and pipe 8 at the point of entry of pipe 11 be rather closely coupled together, becasue when the carbon black concentration in line 133 commences to approach the upper limit of 50% it tends to lose its fluid properties and become more or less plastic, and therefore cannot be forced through a very long pipe 133 and 11. One it enters line 8, however, it is readily picked up by the essentially hydrocarbon feed and of course if passed through pump 14 is mixed therewith and its viscosity greatly reduced.

Centrifuge 126 separates from the concentrated product 128 a more aqueous product 134 which may be largely water and which passes through valve 136 into return line 137 to pipe 84 from whence it is recycled through pump 86 and line 87 to the water washing step 73. Return line 137 also picks up any water being returned from the carbon black oil absorption system when that is being used, coming through line 138 controlled by valve 139. When thickener 109 is by-passed by flow through line 116 it is not recommended that the unthickened slurry pass through valve 122 and line 11 into the feed at 8, but that instead it be further thickened in line 126 or used in the carbon black oil extraction system to be described later. In many instances, however, passage of the carbon black slurry through thickener 109 gives sufficient thickening so that it may then bypass both centrifuge 126 by closing valve 123 and the oil extraction system by closing valve 121, valve 132 also being closed, and passed through line 122 directly into the feed at 8.

When the oil extraction system is used, the carbon black slurry in pipe 89 may pass through line 108 and thickener 109, or bypass the thickener through line 116, it being understood that thickener 109 may be any one of a number of known types of thickeners, and then the slurry may pass through line 117, and pass through valve 121 into line 124 of the carbon black oil extraction system, which consists of a mixing tank 141 and a phase separation tank 142.

In the mixing tank 141 normally liquid hydrocarbon from tank 2 coming through line 3 is passed through valve 7 into the mixing tank where it is mixed with the aqueous slurry coming in through line 124 by any type of mixing means such as a high speed stirrer having a motor 143 as indicated in the drawing. The more or less homogeneous mixture, or emulsion, may be transferred to slurry separation tank 142 by gravity or by any usual pump 144 through pipe 146.

In the phase separation tank 142 there is formed by gravity separation an oil phase 147 and a water phase 148 separated by an interface 149. In the process of separating and forming the water and oil phase, the carbon black, due to its oleophilic properties and hydrophobic properties, tends to transfer from the aqueous slurry into an oil slurry, passing into the oil phase, although in some instances it does take a little water along with it entrained therein, which is of little consequence. This transfer of the carbon black from the aqueous slurry to the oil phase 147 in phase separator 142 is aided, if desired, by a low-speed agitator driven by motor 151. The resulting oil phase is fed through valve 12 and line 9 into the feed to the carbon black reactors 8, while the water-phase is drained from the tank 142 through line 138, controlled by valve 139 into return line 137, by gravity or by the pump shown in line 138. This withdrawal may be continuous or it may be controlled by the usual liquid level interface controllers (not shown).

In some instances it may be desired to run all, or any desired portion, of the carbon black slurry produced in pipes 9 or 11 into the auxiliary fuel pipe 41 of one or more selected furnaces when auxiliary liquid fuel is being employed in said selected furnaces. For example, furnace 26 may be such a furnace employing a liquid fuel, as such furnaces can use either gas or liquid fuel as auxiliary fuel, and as pointed out above the furnaces connected to pipes 29, 31 and 32 may be similar, or different types as desired, some with only feed from 17, some with feed from 17 and air only from a supply similar to 39 and some with feed 17, air from a supply like 39 and fuel from a supply like 41, the fuel being gas, or any liquid fuel either the same as the oil from tank 2, or an entirely different grade of fuel generally but not necessarily hydrocarbon fuel. The oil in tank 152 therefore may be the same as in tank 2, or it may be any other liquid fuel composition known to the prior art such as oil, gasoline, alcohol or the other common liquid fuels. When the carbon black slurry is to pass entirely, or in any fraction to the fuel line 41 of said selected furnaces, valves 12, 13, 153 and/or 154 are suitably adjusted for the flow desired and the slurry from lines 9 and/or 11 passes into line 156 where it may be mixed with the liquid fuel and distributed to auxiliary fuel line 41 of said selected furnaces.

Some fuel may be converted to carbon black but most such operations are preferably carried out so that most of the fuel, and contained slurry, is burned and does not directly enter the product, except as heat energy.

*Operation*

As the operation of the device has been described in some detail in describing the system and apparatus employed in the practice of the processes, above, it is believed that all that is now needed is a short summary of the operation, which will now be given:

A normally liquid hydrocarbon feed comprising a major portion of normally liquid hydrocarbon with or without a minor portion of suspended carbon black and/or water is pyrochemically converted in carbon black reactor 26 into a gaseous effluent containing suspended carbon black particles in conduit 44. This gaseous effluent is cooled, and the cooling may be merely indirect heat exchange through the walls of conduit 44 or it can include indirect heat exchange with other cooling fluid and/or direct injection of cooling fluids such as water, at water sprays 51 and/or 52. The suspended carbon black is then recovered by separating the same from the gaseous effluent by suitable separation means which may consist entirely of wet separation steps but which preferably include dry separation steps such as 59, 61 and 62. Whether separation steps 59, 61 and 62 are dry or wet, they remove the major portion of the carbon black which is taken off through pipe 68. A portion of the suspended carbon black is recovered by water washing as an aqueous slurry, either in the bottom of tower 54 or in the bottom of waterwasher 73 or both. Said aqueous slurry is partially dewatered (1) by being passed through thickener 109 and centrifuge 126 or their equivalents; (2) or by being passed through thickener 109, into mixing tank 141 and oil-water phase separator tank 142, in which the aqueous slurry from line 124 is mixed in tank 141 with normally liquid hydrocarbon from tank 2 entering through valve 7 and is then passed through line 146 to tank 142 where the carbon black transfers to the oil and is removed through line 9 as an oil slurry, while the water is returned through line 138; (3) or the aqueous slurry in line 89 is partially dewatered in thickener 109 and is mixed with the normally liquid hydrocarbon in line 8; (4) or the carbon black aqueous slurry in line 89 is run through bypass line 116 and valve 121 into mixing tank 141 and phase separation tank 142 where it is given the same treatment in less concentrated form but otherwise the same as described above under (2).

In each case said aqueous slurry is partially dewatered and then mixed with further normally liquid hydrocarbons in line 8 coming from tank 2 through line 3 and the resulting mixture in tank 17 is then used as the feed 28 to said pyrochemical conversion 26; or as feed to another pyrochemical conversion in a separate carbon black reactor to which lines 29, 31 and 32 lead, the gaseous effluent of which contains dry carbon black particles which may be collected in the same or in any other known manner (not shown) which include collecting a portion of the carbon black thereof as a water slurry, or not, as desired, and if a second water slurry is produced it may be at least partially dewatered and mixed with further normally liquid hydrocarbons to form feed for the same or for further pyrochemical conversion, or not, as desired.

When carbon black slurry is employed in part or in whole as fuel to any desired selected furnace, a liquid fuel, which can be the same as oil in tank 2, or any different liquid fuel, is run from tank 152 into line 156 where the carbon black slurry from lines 9 and/or 11 is added through valves 153 and/or 154, and the mixture is conveyed to pipe 41 of said selected furnace, and a pump 155 may be employed to cause this transfer and further mix the liquid fuel and slurry. As the major portion of the fuel is intended to be burned its composition is not critical and the carbon black contained therein will in part be burned and to that extent not enter the final product.

While certain specific processes and specific systems of apparatus have been shown in the drawings and described above, for purposes of illustration, the invention obviously is not limited thereto.

Having described our invention, we claim:

1. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps as a dry flocculent powder, removing a minor portion of said carbon black from said effluent by water washing a portion of said effluent to remove said carbon black particles in the form of an aqueous slurry, at least partially dewatering said slurry, mixing said at least partially dewatered slurry with a liquid and returning the resulting mixture to a pyrochemical conversion step.

2. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps comprising coagulating the carbon black particles in larger particles by subjecting them to an electrostatic field between oppositely charged members and collecting the resulting particles by cyclone separation as a dry flocculent powder, removing a minor portion of said carbon black from said effluent by water washing a portion of said effluent to remove said carbon black particles in the form of an aqueous slurry, at least partially dewatering said slurry, mixing said at least partially dewatered slurry with a liquid, and passing the resulting mixture to a pyrochemical conversion step, thus completing a cycle.

3. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps as a dry flocculent powder, removing a minor portion of said carbon black from said effluent by water washing a portion of said effluent to remove said carbon black particles in the form of an aqueous slurry, at least partially dewatering said slurry by thickening the slurry, mixing said at least partially dewatered slurry with said normally liquid hydrocarbon to produce said feed, and passing said feed to said pyrochemical conversion step, thus completing a cycle.

4. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps as a dry flocculent powder, removing a minor portion of said carbon black from said effluent by water washing a portion of said effluent to remove said carbon black particles in the form of an aqueous slurry, at least partially dewatering said slurry by continuously thickening the slurry and centrifuging the same to remove water, mixing said at least partially dewatered slurry with said normally liquid hydrocarbon to produce said feed, and passing said feed to said pyrochemical conversion step, thus completing a cycle.

5. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps as a dry flocculent powder, removing a minor portion of said carbon black from said effluent by water washing a portion of said effluent to remove said carbon black particles in the form of an aqueous slurry, removing carbon black from said slurry by mixing the slurry with a normally liquid hydrocarbon to transfer said carbon black which is by nature hydrophobic from the aqueous slurry into an oil slurry, mixing said oil slurry with said normally liquid hydrocarbon to produce said feed, and passing said feed to said pyrochemical conversion step, thus completing a cycle.

6. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps as a dry, flocculent powder, removing a minor portion of said carbon black from said effluent by water washing a portion of said effluent to remove said carbon black particles in the form of an aqueous slurry, at least partially dewatering said slurry by thickening said slurry to reduce the water content, mixing said thickened slurry with a normally liquid hydrocarbon to transfer said carbon black which is by nature hydrophobic from the aqueous slurry into an oil slurry, mixing said oil slurry with said normally liquid hydrocarbon to produce said feed, and passing said feed to said pyrochemical conversion step, thus completing a cycle.

7. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps as a dry, flocculent powder, removing a minor portion of said carbon black from said effluent by water washing a portion of said effluent to remove said carbon black particles in the form of an aqueous slurry, at least partially dewatering said slurry by thickening said slurry and centrifuging the same to reduce the water content, mixing said thickened and centrifuged slurry with a normally liquid hydrocarbon to transfer said carbon black which is by nature hydrophobic from the aqueous slurry into an oil slurry, mixing said oil slurry with said normally liquid hydrocarbon to produce said feed, and passing said feed to said pyrochemical conversion step, thus completing a cycle.

8. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps comprising coagulating the carbon black particles in larger particles by subjecting them to an electrostatic field between oppositely charged members and collecting the resulting particles by cyclone separation as a dry, flocculent powder, removing a minor portion of said carbon black from said effluent by water washing a portion of said effluent to remove said carbon black particles in the form of an aqueous slurry, at least partially dewatering said slurry by thickening the slurry, mixing said at least partially dewatered slurry with said normally liquid hydrocarbon to produce said feed, and passing said feed to said pyrochemical conversion step, thus completing a cycle.

9. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps comprising coagulating the carbon black particles in larger particles by subjecting them to an electrostatic field between oppositely charged members and collecting the resulting particles by cyclone separation as a dry, flocculent powder, removing a minor portion of said carbon black from said effluent by water washing a portion of said effluent to remove said carbon black particles in the form of an aqueous slurry, at least partially dewatering said slurry by continuously thickening the slurry and centrifuging the same to remove water, mixing said at least partially dewatered slurry with said normally liquid hydrocarbon to produce said feed, and passing said feed to said pyrochemical conversion step, thus completing a cycle.

10. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps comprising coagulating the carbon black particles in larger particles by subjecting them to an electrostatic field between oppositely charged members and collecting the resulting particles by cyclone separation as a dry flocculent powder, removing a minor portion of said carbon black from said effluent by water washing a portion of said effluent to remove said carbon black particles in the form of an aqueous slurry, removing carbon black from said slurry by mixing the slurry with a normally liquid hydrocarbon to transfer said carbon black which is by nature hydrophobic from the aqueous slurry into an oil slurry, mixing said oil slurry with said normally liquid hydrocarbon to produce said feed, and passing said feed to said pyrochemical conversion step, thus completing a cycle.

11. A process for producing carbon black comprising the steps of pyrochemically converting a feed comprising a major portion of normally liquid hydrocarbon and a minor portion of carbon black into a gaseous effluent comprising gases and dry carbon black particles suspended in said effluent, cooling said gaseous effluent, removing the major portion of said suspended carbon black from said effluent by dry separation steps comprising coagulating the carbon black particles in larger particles by subjecting them to an electrostatic field between oppositely charged members and collecting the resulting particles by cyclone separation as a dry, flocculent powder, removing a minor portion of said carbon black from said effluent by water washing a portion of said effluent to remove said carbon black particles in the form of an aqueous slurry, removing carbon black from said slurry by thickening said slurry to reduce the water content, mixing said thickened slurry with a normally liquid hydrocarbon to transfer said carbon black which is by nature hydrophobic from the aqueous slurry into an oil slurry, mixing said oil slurry with said normally liquid hydrocarbon to produce said feed, and passing said feed to said pyrochemical conversion step, thus completing a cycle.

12. A process for producing carbon black comprising the steps of pyrochemically converting a feed comprising a major portion of normally liquid hydrocarbon into a gaseous effluent comprising gases and dry carbon black particles suspended in said effluent, cooling said gaseous effluent, removing the major portion of said suspended carbon black from said effluent by dry separation steps as a dry flocculent powder, removing a minor portion of said carbon black from said effluent by water washing a portion of said effluent to remove said carbon black particles in the form of an aqueous slurry, at least partially dewatering said slurry, mixing said at least partially dewatered slurry with a second normally liquid hydrocarbon to produce a second feed, and passing said feed to a second pyrochemical conversion step, converting said second feed into a second gaseous effluent comprising gases and suspended carbon black, cooling, and separating said carbon black from said second gaseous effluent.

References Cited in the file of this patent

UNITED STATES PATENTS

| | | |
|---|---|---|
| Re. 22,886 | Ayers | June 3, 1947 |
| 1,276,487 | Brownlee et al. | Aug. 20, 1918 |
| 1,373,704 | Bates | Apr. 5, 1921 |
| 1,438,032 | Frost | Dec. 5, 1922 |
| 1,902,746 | Yunker | Mar. 21, 1933 |
| 1,987,643 | Spear et al. | Jan. 15, 1935 |
| 2,062,358 | Frolich | Dec. 1, 1936 |
| 2,254,572 | Harlow | Sept. 2, 1941 |
| 2,346,754 | Hemminger | Apr. 18, 1944 |
| 2,375,795 | Krejci | May 15, 1945 |
| 2,564,700 | Krejci | Aug. 21, 1951 |
| 2,564,736 | Stokes | Aug. 21, 1951 |
| 2,585,659 | Kilpatrick | Feb. 12, 1952 |
| 2,587,107 | Cade | Feb. 26, 1952 |

OTHER REFERENCES

Chemical Engineering, vol. 59, No. 9, September 1950, pages 203 and 205.